US012579341B2

(12) United States Patent
Mao et al.

(10) Patent No.: US 12,579,341 B2

(45) Date of Patent: Mar. 17, 2026

(54) METHOD FOR DETERMINING A WELD DESIGN FOR A MULTI-WELD COMPONENT

(71) Applicants: Jianghui Mao, Rochester Hills, MI (US); Baizhong H Lin, Windsor (CA); Frederick J Zweng, Rochester Hills, MI (US)

(72) Inventors: Jianghui Mao, Rochester Hills, MI (US); Baizhong H Lin, Windsor (CA); Frederick J Zweng, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 1130 days.

(21) Appl. No.: 17/223,657

(22) Filed: Apr. 6, 2021

(65) Prior Publication Data

US 2022/0318460 A1      Oct. 6, 2022

(51) Int. Cl.
*G06F 30/20*      (2020.01)
*G06F 30/23*      (2020.01)
*G06F 111/10*      (2020.01)

(52) U.S. Cl.
CPC .............. *G06F 30/23* (2020.01); *G06F 30/20* (2020.01); *G06F 2111/10* (2020.01)

(58) Field of Classification Search
CPC ...... G06F 30/23; G06F 30/367; G06F 30/398; G06F 2111/10; G06F 30/15; G06F 2119/14; G06F 2119/18; G06F 30/17; G06F 30/12; G06F 30/20; G06F 30/25; G06F 30/27; G06F 30/28
See application file for complete search history.

(56) References Cited

U.S. PATENT DOCUMENTS

2007/0090165 A1 * 4/2007 Kumagai ................ G06F 30/23
                                                                    228/101
2017/0255718 A1 * 9/2017 Yalamanchili ......... B23K 31/02

OTHER PUBLICATIONS

Blowey, A., "Optimisation of Welds With Manufacturing Considerations", 2011 Simulia Customer Conference, pp. 1-12 (Year: 2011).*

(Continued)

*Primary Examiner* — Michael Edward Cocchi

(74) *Attorney, Agent, or Firm* — Jeremy J. Klobucar

(57) ABSTRACT

A method for determining seam weld length pattern for a component includes generating a baseline finite element model wherein each weld line having a base length, each weld line comprises a first end and a second end. The method also includes generating a first set of finite element models, each of the first set of models having one weld end shortened while all other weld ends at base length, generating a second set of finite element models, each of the second set of models having one weld end lengthened while all other weld ends at base length, generating fatigue data for the baseline finite element model, first and second set of finite element models. Combination models are created by comparing fatigue data between for each weld pair. The method further determines combination model fatigue data for each combination model, determines a minimum fatigue life for each of the combination models from the fatigue data and selects a weld pattern of the combination model having a highest minimum fatigue life value.

3 Claims, 8 Drawing Sheets

(56) References Cited

OTHER PUBLICATIONS

Hobbacher, A., "Recommendations for Fatigue Design of Welded Joints and Components", International Institute of Welding, pp. 1-149 (Year: 2008).*

Tchernov, Stanislav, and John A. Goldak. "Can a Weld in Welded Structure Be Made With Zero Residual Stress?." Pressure Vessels and Piping Conference. vol. 57007. American Society of Mechanical Engineers, 2015. (Year: 2015).*

Blowey, A., "Optimisation of Welds With Manufacturing Considerations", 2011 Simulia Customer Conference, pp. 1-12.

Andersson, Filip et al., "Spot-Weld Fatigue Optimization", Royal Institute of Technology, Master Thesis, 76 pages.

Li, Qing et al., "Evolutionary structural optimization for connection topology design of multi-component systems", Engineering Computations, vol. 18, No. 3/4, 2001, pp. 460-479.

Hobbacher, A., "Recommendations for Fatigue Design of Welded Joints and Components", International Institute of Welding, pp. 1-149.

* cited by examiner

| WELD LINE | RUN NUMBER | |
| --- | --- | --- |
| | TRADITIONAL METHOD | CURRENT SYSTEM |
| 1 | 9 | 7 |
| 2 | 81 | 13 |
| 3 | 729 | 19 |
| 4 | 6561 | 25 |
| 5 | 59049 | 31 |
| 6 | 531441 | 37 |
| 7 | 4782969 | 43 |
| 8 | 43046721 | 49 |
| 9 | 387420489 | 55 |
| 10 | 3486784401 | 61 |

SENSITIVITY MODEL a2    FIG. 3D

SENSITIVITY MODEL a1    FIG. 3C

SENSITIVITY MODEL

| | $a_1$ LIFE (LENGTH) | $b_1$ LIFE (LENGTH) | | $f_1$ LIFE (LENGTH) |
|---|---|---|---|---|
| a | 120(S) | 285(N) | | 103(N) |
| b | 98(N) | 1620(S) | | 712(N) |
| c | 72(N) | 403(N) | • • • • • • • • | 634(N) |
| d | NI(N) | 100(N) | | NI(N) |
| e | 1431(N) | 83(N) | | 142(N) |
| f | 500(N) | NI(N) | | 119(S) |

LIFE CHART FOR 1 SHORT

FIG. 5A

SENSITIVITY MODEL

| | $a_2$ LIFE (LENGTH) | $b_2$ LIFE (LENGTH) | | $f_2$ LIFE (LENGTH) |
|---|---|---|---|---|
| a | 946(L) | 1521(N) | | 353(N) |
| b | 820(N) | 803(L) | | 822(N) |
| c | 640(N) | 560(N) | • • • • • • • • | 915(N) |
| d | NI(N) | 420(N) | | 812(N) |
| e | 115(N) | 891(N) | | 201(N) |
| f | 94(N) | 791(N) | | 268(L) |

LIFE CHART FOR 1 LONG

FIG. 5B

SENSITIVITY MODEL

| | $a_3$ LIFE (LENGTH) | $b_3$ LIFE (LENGTH) | | $f_3$ LIFE (LENGTH) |
|---|---|---|---|---|
| a | 125(N) | 125(N) | | 125(N) |
| b | 83(N) | 83(N) | | 83(N) |
| c | 551(N) | 551(N) | • • • • • • • • | 551(N) |
| d | 212(N) | 212(N) | | 212(N) |
| e | 812(N) | 812(N) | | 812(N) |
| f | 894(N) | 894(N) | | 894(N) |

LIFE CHART FOR ALL BASELINE

FIG. 5C

COMBINATION MODEL a

| a | 946(L) |
|---|---|
| b | 1521(L) |
| c | • |
| d | • |
| e | • |
| f | 353(L) |

| WELD LOC. | BASELINE | WELD PATTERN | | | | | | | | | | | |
|---|---|---|---|---|---|---|---|---|---|---|---|---|---|
| | | COMBO 1 | COMBO 2 | COMBO 3 | COMBO 4 | COMBO 5 | COMBO 6 | COMBO 7 | COMBO 8 | COMBO 9 | COMBO 10 | COMBO 11 | COMBO 12 |
| 1a | S | S | L | S | L | L | S | S | S | L | L | L | S |
| 1b | L | L | S | L | L | L | L | L | L | L | L | L | L |
| 2a | N | L | L | S | L | L | N | N | N | S | S | L | N |
| 2b | N | S | L | L | L | L | N | N | N | S | N | L | N |
| 3a | L | S | S | S | L | N | L | L | L | S | S | L | L |
| 3b | L | L | L | L | S | S | L | L | L | S | L | L | L |
| 4a | L | S | S | L | S | N | L | L | L | S | S | L | L |
| 4b | S | S | L | L | S | S | S | S | S | S | S | S | S |
| 5a | N | L | L | S | S | S | N | N | N | N | L | N | N |
| 5b | S | L | L | L | L | L | S | S | S | S | S | N | S |
| 6a | S | L | L | L | L | L | S | S | S | S | S | N | S |
| 6b | L | S | L | S | L | L | L | L | L | S | S | L | L |

FIG. 7B

FATIGUE LIFE

| WELD LOC. | BASELINE | COMBO 1 | COMBO 2 | COMBO 3 | COMBO 4 | COMBO 5 | COMBO 6 | COMBO 7 | COMBO 8 | COMBO 9 | COMBO 10 | COMBO 11 | COMBO 12 |
|---|---|---|---|---|---|---|---|---|---|---|---|---|---|
| 1a | 267% | 709% | 138% | 267% | 173% | 403%(L) | 267% | 267% | 267% | 173% | 463% | 434% | 267% |
| 1b | 170% | 77% | 519% | 170% | 313% | 353%(L) | 170% | 170% | 170% | 112% | 362% | 106% | 170% |
| 2a | NI | NI | NI | NI | NI | NI(L) | NI | NI | NI | NI | NI | NI | NI |
| 2b | 505% | 279% | 1135% | 505% | NI | 1082%(L) | 505% | 505% | 505% | 289% | 286% | 763% | 505% |
| 3a | 779% | 710% | 1273% | 779% | 633% | 1095%(N) | 779% | 779% | 779% | 1297% | 951% | 778% | 779% |
| 3b | NI | NI | NI | NI | NI | NI(L) | NI | NI | NI | NI | NI | NI | NI |
| 4a | NI | 1126% | NI | NI | 1796% | NI(S) | NI | NI | NI | NI | NI | NI | NI |
| 4b | NI | NI | 497% | NI | NI | 943%(N) | NI | NI | NI | NI | 2092% | 871% | NI |
| 5a | 1134% | 1164% | NI | 1134% | 1086% | NI(S) | 1134% | 1134% | 1134% | 1222% | 992% | NI | 1134% |
| 5b | 526% | 704% | 701% | 526% | 770% | 705%(L) | 526% | 526% | 526% | 628% | 882% | 234% | 526% |
| 6a | 417% | 922% | 203% | 417% | 668% | 831%(L) | 417% | 417% | 417% | 234% | 190% | 1573% | 417% |
| 6b | NI | NI | NI | NI | NI | NI(L) | NI | NI | NI | NI | NI | NI | NI |
|  |  |  |  |  |  |  |  |  |  |  |  |  |  |
| MIN. | 170% | 77% | 138% | 170% | 173% | 353% | 170% | 170% | 170% | 112% | 190% | 106% | 170% |

FIG. 7C

METHOD FOR DETERMINING A WELD DESIGN FOR A MULTI-WELD COMPONENT

FIELD

The present disclosure relates generally to welding components and, more particularly, to a method for determining weld links of multi-welds for a component.

BACKGROUND

Many systems such as automotive vehicle frames include multiple seam weld joints. A typical frame includes 40-50 seam weld joints. Each joint, in turn, has multiple seam weld lines. The length of the seam weld lines may significantly affect the fatigue performance of the other seam welds in the frame. Longer seam welds do not necessarily result in a stronger frame. One solution that has been used for many years is the experience of an engineer in determining the weld lengths. Optimizing weld joints based on experience has its drawbacks. It is nearly impossible to fully appreciate the interaction of the weld joints particularly with so many weld joints in a vehicle. Another solution is to perform finite element modeling (FEM) on every combination for every length of weld.

SUMMARY

The present disclosure significantly reduces the amount of calculation while improving results based on experience alone.

In one aspect of the disclosure, a method of selecting a weld pattern for a component includes determining seam weld length for a plurality of weld lines optimization for a system includes generating a baseline finite element model wherein each weld line having a base length, each weld line comprises a first end and a second end. The method also includes generating a first set of finite element models, each of the first set of models having one weld end shortened while all other weld ends at base length, generating a second set of finite element models, each of the second set of models having one weld end lengthened while all other weld ends at base length, generating fatigue data for the baseline finite element model, first and second set of finite element models. Combination models are created by comparing fatigue data between for each weld pair. The method further determines combination model fatigue data for each combination model, determines a minimum fatigue life for each of the combination models from the fatigue data and selects a weld pattern of the combination model having a highest minimum fatigue life value.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3C is a figure representing the determination of a sensitivity model a1.

FIG. 3D is a figure representing the determination of a sensitivity model a2.

FIG. 5A is a sensitivity model generated in FIG. 4.

FIG. 5B is a sensitivity model for a long length.

FIG. 5C is a baseline sensitivity model.

FIG. 6B is an example of a combination model for end a.

FIG. 7A is a top view of a plurality of components being welded together with six welds.

FIG. 7B is an analysis for the combination model.

FIG. 7C is a seam weld fatigue results data generated from FIG. 7B based upon the optimum lengths determined.

DETAILED DESCRIPTION

Example embodiments will now be described more fully with reference to the accompanying drawings.

Figures 1, 2:
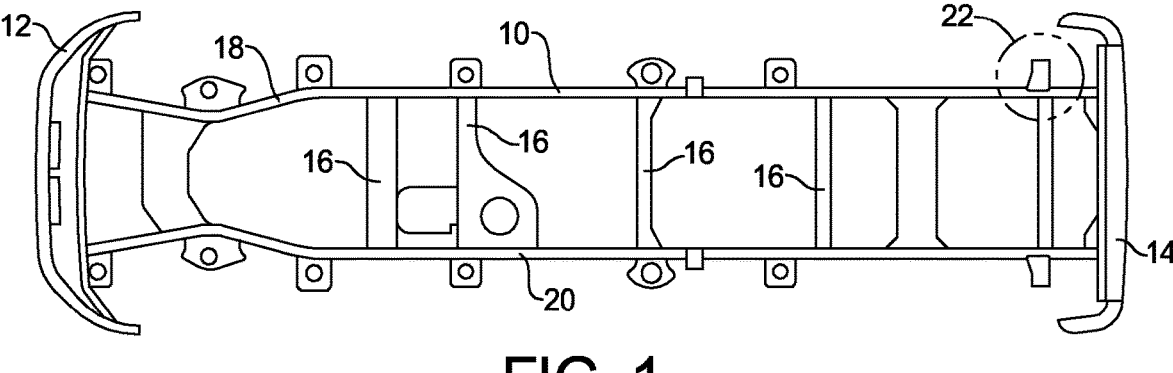
FIG. 1 is a top view of a frame having weld lines according to the present disclosure.
FIG. 2 is a chart for the number of weld lines and the number of analyses provided in the present disclosure versus traditional methods.

Referring now to FIG. 1, a vehicle frame 10 is illustrated of an example of a component with a plurality of weld lines. The vehicle frame 10 is being used to support a front bumper 12 and a rear bumper 14. A number of cross members 16 are supported between a first frame rail 18 and a second frame rail 20. Typically, the frame rails 18, 20 are coupled to the cross member 16 with multiple joints, each joint typically has multiple seam weld lines. An example joint 22 is described below in FIG. 7A. The length of the weld lines may significantly affect the fatigue performance of all the other seam welds in the frame. Therefore, the present disclosure seeks to find an optimum result (longest life overall) without performing analysis for every possible combination.

Referring now to FIG. 2, a chart illustrating 10 weld lines for a vehicle system is set forth. In a traditional method, a huge combination of assessments ($3^{2n}$) are needed. As can be seen, more than three billion combinations are possible when the weld lines for a system are only 10 in number. As mentioned above, for a vehicle frame there are 40-50 weld joints typically, each contains multiple weld lines. In the present disclosure, a significantly reduced amount of combinations and therefore calculations are needed. Should the number of weld lines be 10, 61 combination assessments are provided. This is significantly different as can be seen in the chart.

Figures 3A, 3B:
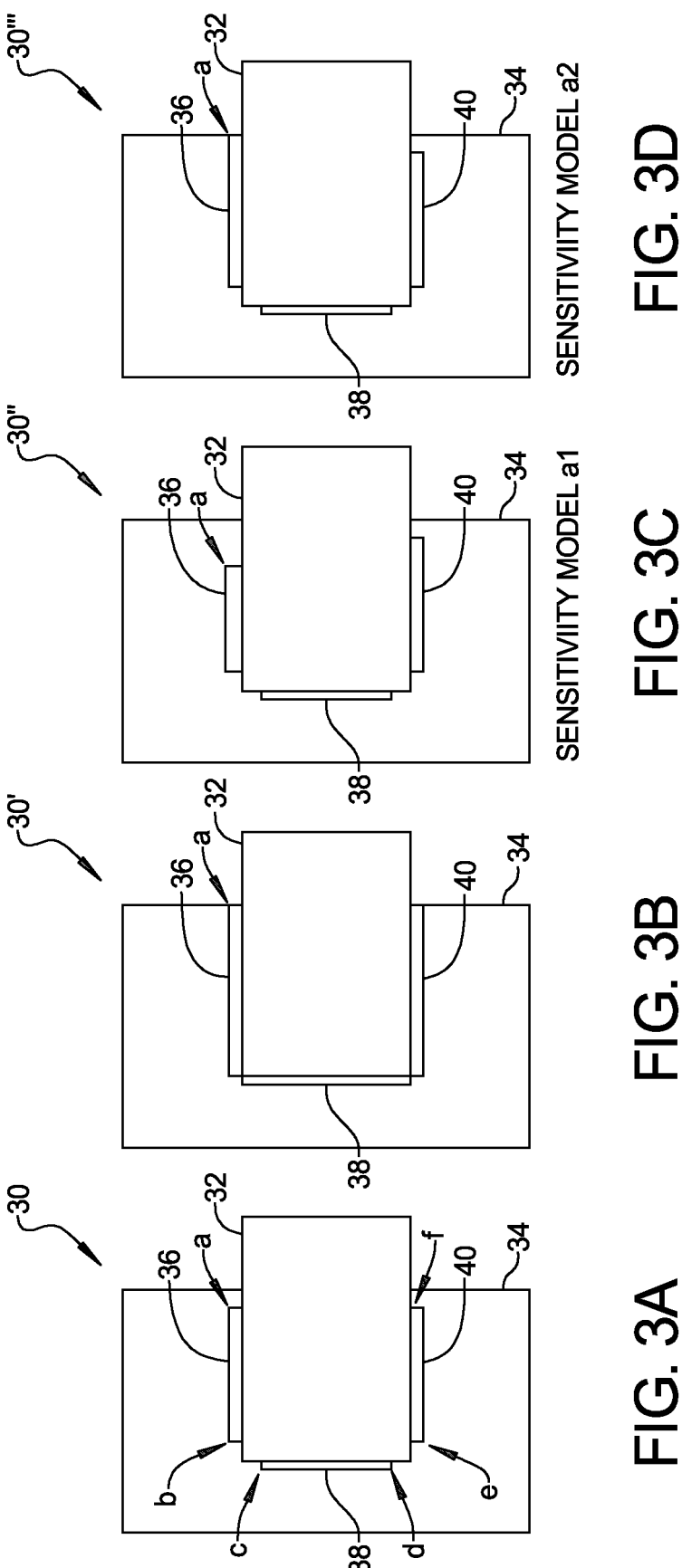
FIG. 3A is a side representation of a weld joint having three weld lines at a baseline weld length.
FIG. 3B is a master weld model.
Figure 4:
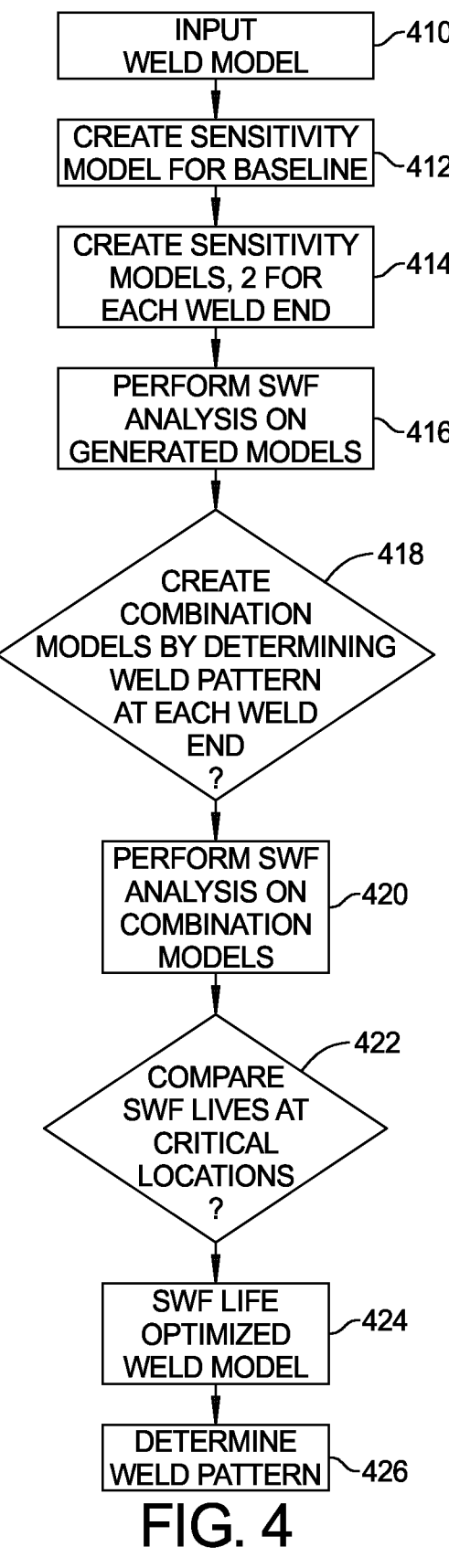
FIG. 4 is a flowchart of a method for determining a weld pattern.

Referring now to FIG. 3A, a weld joint 30 joining a first component 32 to a second component 34 has three weld lines 36, 38, and 40.

Referring now also to FIG. 3B, a master weld model is illustrated that has the weld lines 36', 38', and 40' extending from the corner to the edge of the components. In the present example, FIG. 3A is referred to as the baseline weld wherein each of the weld lines 36, 38, and 40 are referred to as a neutral position. A typical master weld model illustrated in FIG. 3B has a longer length. In FIG. 3A, the weld line 36 has a first end a and a second end b. Weld line 38 has a first end c and second end d. The third weld 40 has a first end e and a second end f. Each of the ends have one unit such as 5 mm removed therefrom. Thus, in the present example, weld lines 36, 38 and 40 are 10 mm (5 mm at each end) shorter than the master weld model illustrated in FIG. 3B.

Sensitivity models are generated for the finite element models (FEM) of the configuration in FIGS. 3C and 3D. The first sensitivity model is referred to as a1. FIG. 3D has a second sensitivity model a2. Sensitivity model a1 has a further reduced first end at end a for weld line 36". The remainder of the weld lines 38, 40 are the same as the baseline. That is, the ends b-f are not lengthened or shortened. In FIG. 3D, the weld line at end a is increased by the unit such as 5 mm. The length of the weld line 36''' is thus 10 mm longer than weld line 36" or 5 mm longer than the baseline weld. To form the sensitivity model a2, the ends b-f remain at the baseline position. For simplicity only, three weld lines are illustrated. However, various numbers of weld lines are implemented in other designs, such as for all 40-50 joints of frame.

Referring now FIG. 3A-3D and FIG. 4, a flow chart with reference to FIGS. 3A-3D is set forth. A weld finite element model is input into a system in step 410. That is, a finite element model of the structure that defines each weld line and the identity of each of the weld lines is provided. In the present example, the baseline weld model illustrated in FIG. 3A as well as the models of FIGS. 3C and 3D, are used. Based on the weld models that are input to the system, a set of sensitivity models for each of the various combinations of short welds and long welds, as well as the baseline, is provided. In step 412, a sensitivity model for the baseline is generated. The sensitivity model a1 is generated by removing 5 mm, in this example, or one weld unit from the base weld line as illustrated by weld line 36" in FIG. 3C. The other ends of the other welds 38 and 40 remain at the baseline length. The second sensitivity model a2 increases end a by the unit such as 5 mm to form weld lines 36'''. The other weld lines 38 and 40 remain the same. Sensitivity models for each of the other ends b, c, d, e and f illustrated in FIG. 3A are performed in a similar manner. Sensitivity model b1 has a shortened length while ends a, and c-f are at the baseline position (neither lengthened nor shortened). Model b2 is similar to b1 except b is lengthened, Model f1 for example has end shortened and ends a-e are at the baseline position. Sensitivity model f2 has end f lengthened while ends a-e are at the base length. Thus, 4n sensitivity models for FIGS. 3C and 3D are obtained. The total number of sensitivity models in the set is 4n+1, where n is the number of weld lines. The Plus 1 is from the baseline sensitivity model. The sensitivity models, two for each weld end, are generated at step 414. The sensitivity models are finite element models that define each of the weld ends.

In step 416, seam weld fatigue results data (SWF) are provided for each of the sensitivity models and the baseline sensitivity model. The seam weld fatigue results data, in this example, are provided relative to a design fatigue analysis. In the present example, the design fatigue analysis presents a percentage relative to 100% which is the design criteria set during the development of the component. It should be noted that the seam weld fatigue results data that correspond to welds with the longest lengths are not necessarily the ones that provided the longest life. Each of the welds and the length of the weld ends affect the seam fatigue weld results data for the other welds in a system. For example, fatigue results data shows the life of all the joints when the end a1 is shortened and the remaining weld lines are at the baseline position.

Referring now also to FIGS. 5A-5D, charts representing sensitivity models a1, b1-f1 are illustrated in FIG. 5A with the seam weld fatigue results data and the lengths in parentheses. Sensitive models a2, b2 through f2 are illustrated in FIG. 5B with the seam weld fatigue results data and the lengths in parentheses. A baseline sensitivity model is illustrated in FIG. 5C. In these examples, the life percentage compared to the designed life as well as the corresponding short, long or neutral lengths are provided next to the corresponding percentage. Sensitive models a1, b1 and f1 are illustrated in full detail. All six sensitivity models for both one shortened and one lengthened model are easily attainable for a total of 12 in this example with three weld lines. The seam weld fatigue results data for each of the sensitivity models is illustrated by way of percentage and with the corresponding length next to the percentage. As can be seen in FIG. 5A, the fatigue results data have a short a end in the first column, a short b end in the second column and a short f end in the third column. The same is true for FIG. 5B except for long ends are provided in the first column for end a, the second column for end b and the last column for end f. The other ends are at the baseline. In FIG. 5C, all of the lengths are neutral, thus only one column is provided.

Figure 6A:
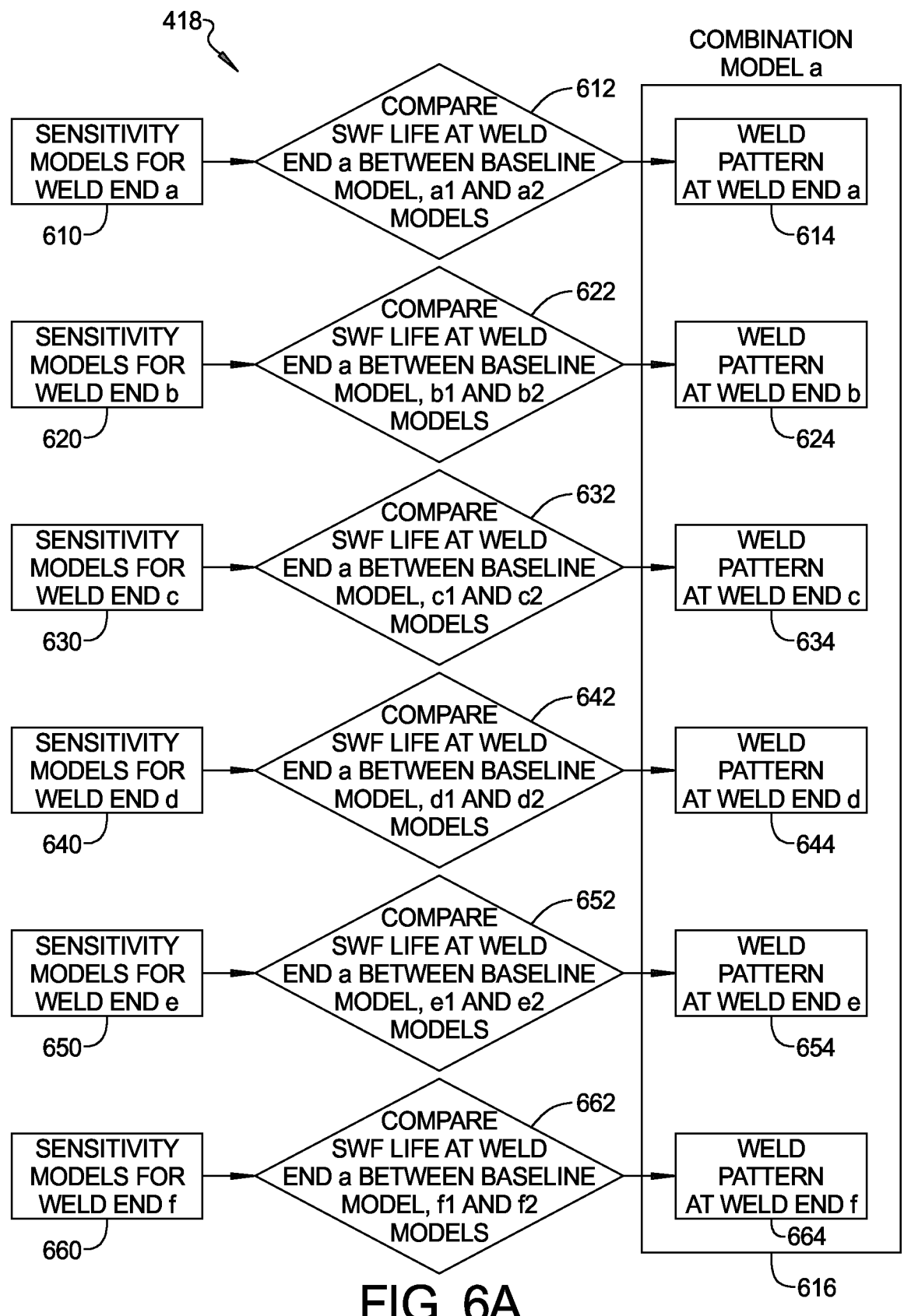
FIG. 6A is a flowchart of a method for determining the combination model A. The remainder of the combination models is performed in a same manner with a different comparison.
Figures 6B, 7A:
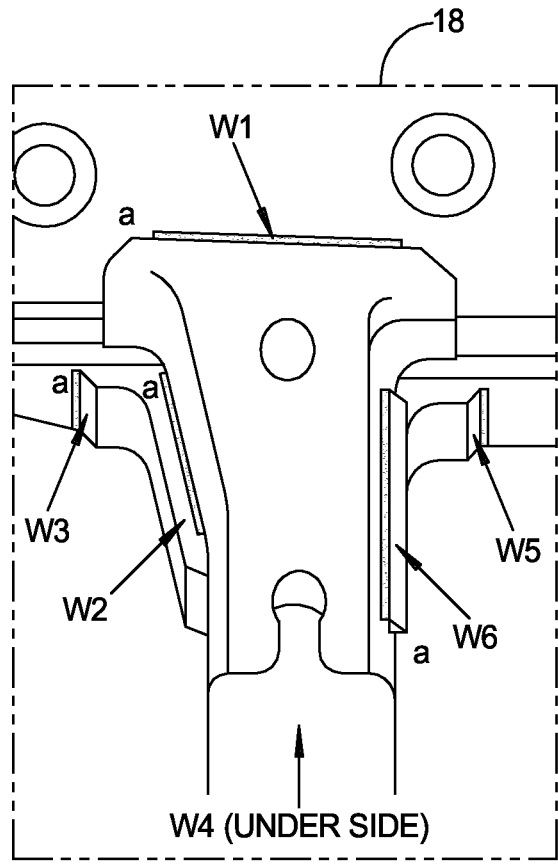

Referring now to step 418 and FIGS. 6A and 6B combination models are generated by determining a weld pattern for each weld end. The number of combination models is 2n where n is the number of total weld lines (or one combination for each end). The combination models are determined using the seam weld fatigue (SWF) results data generated in step 416. In step 418, the combination models are generated in FIG. 6. Thereafter, a seam weld fatigue analysis for each of the combination models is generated in step 420. In FIGS. 6A and B, the example carrying forth with six weld ends for three weld lines is carried forward. In this example, step 610 uses the sensitivity models of FIGS. 5A-C for weld end a that are provided to the comparison block 612. The seam weld fatigue results data at weld end a are compared between the baseline model, SWF results data of model a1 and model a2. The first entry is provided for the weld pattern at end a at 614 in the combination model a 616. Steps 610-660 provide the sensitivity models for each of the ends as illustrated in FIGS. 5A-5C. The seam weld fatigue results data are compared at steps 612, 622, 632, 642, 652 and 662 with the baseline models from each of the respective weld ends. For example, column 1, row 1 of each table in FIGS. 5A-5C, is compared and the best results data or the length with the best life or fatigue result at weld end a is provided for weld end a in the combination model at the top of the column in FIG. 6B. In the comparison of step 622, the column 2, row 1 of FIGS. 5A, 5B and FIG. 5C are compared. That is, the best SWF result data (longest life analysis) for end a (or the length associated therewith at weld end b) is provided for weld end b of the combination model in the second box of the column at step 624. The same takes place for the entire set including step 660 which provides the weld pattern for weld end f of the combination model a. The best results data for the first row of the last column of FIGS. 5A, 5B and of FIG. 5C are compared to find the best length which is included within block 664. In FIG. 6B 946 (L) is the first row of the combination model for a, 1521 (L) in the second row and 353 (L) in the last row. Combination models for weld b, c, d, e, and f are also generated in the same way in steps 624, 634, 644, 654 and 664, respectively. However, weld ends b, c, d, e and f are compared in each of the step 612-662 rather than end a. For example, combination model b uses the best life numbers in row b of FIGS. 5A-C to select the corresponding length. Starting at column 1 and moving across to column 6 to obtain respective life/and lengths. Combination model f uses the best life numbers/lengths in row f to select the length. The same sensitivity models 610-660 are still provided to steps 612-662. However, the combination models will be different. Once the combination models are obtained FEMs with the lengths in the combination models is analyzed to obtain SWF results data for each combination model, one for each end in step 424. In step 426, the weld pattern with the highest minimum fatigue results data is chosen. This is described in more detail below.

Referring now to FIG. 7A, a system with six welds Weld1 (W1), Weld2 (W2), Weld3 (W3), Weld5 (W5) and Weld6 (W6) are illustrated. Weld4 is on the underside and thus is not described (although results are illustrated in the table. In FIG. 7B, a table illustrating the weld location and the lengths associated with the combination models are set forth.

In FIG. 7C, once the lengths of each of the best fatigue results data are generated (step 418) to obtain the 12 combination models (Combo 1-Combo 12), new analysis for seam weld fatigue results data are generated in step 422. That is, because the particular weld analysis with the different lengths being long, short or normal have not been calculated prior, the fatigue lives using the lengths in the combo model are calculated to form seam weld fatigue results data that are illustrated in FIG. 7C. Thus, the weld fatigue results data are only run for 2n number of models (one for each end of the weld line). In this case, because 12 weld ends for six weld lines are provided, 12 more models to determine the seam weld fatigue are generated. This is performed in step 422 as illustrated above. In step 424, the minimum values of each of Combo 1-12 are place in the bottom row. The combination model with the highest minimum value for the fatigue life is selected. In this example, combination number 5 has the highest minimum fatigue life at 353%. Thus, the final chosen pattern has weld line 1a as a long weld line, 1b as a long, weld line 2a as a long, 2b as a long, 3a is normal or at the baseline, weld end 3b is long, weld line 4a is short, weld line 4b is baseline or normal, weld line 5a is short, weld line 5b is long, weld line 6a is long and weld line 6b is long. It should be noted that "NI" refers to an infinite life as determined by the system analysis. In this manner, the lengths of each of the weld ends is the weld pattern selected for use. This is generated in step 424. Step 426 determines the weld pattern using the optimized weld model of step 424.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of determining a weld pattern for components comprising a first weld line comprising a first end and a second end, a second weld line comprising a third end and a fourth end, and a third weld line comprising a fifth end and a sixth end, the first end, the second end, the third end, the fourth end, the fifth end and the sixth end collectively forming a plurality of weld ends, said method comprising:

determining a baseline fatigue sensitivity model using a first baseline position for the first end, a second baseline position for the second end, a third baseline position for the third end, a fourth baseline position for the fourth end, a fifth baseline position for the fifth end and a sixth baseline position for the sixth end, said first baseline position and the second baseline position defining a first baseline length for the first weld line, the third baseline position and the fourth baseline position defining a second baseline length for the second weld line, the fifth baseline position and the sixth baseline position defining a third baseline length for a third weld of the third weld line;

generating baseline seam weld fatigue data from the baseline fatigue sensitivity model;

determining a first fatigue sensitivity model for the first end by changing the first baseline position for the first end to change the first weld line to a fourth length less than the first baseline length while maintaining the second baseline position of the second end, the third baseline position and the fourth baseline position of the second weld line and the fifth baseline position and the sixth baseline position of the third weld line;

generating first seam weld fatigue data from the first fatigue sensitivity model;

determining a second fatigue sensitivity model for the first end by changing the first baseline position for the first end to change the first weld line to a fifth length greater than the first baseline length while maintaining the second baseline position of the second end, the third baseline position and the fourth baseline position of the second weld line and the fifth baseline position and the sixth baseline position of the third weld line;

generating second seam weld fatigue data from the second fatigue sensitivity model;

determining a third fatigue sensitivity model for the second end by changing the second baseline position for the second end to change the first weld line to a sixth length less than the first baseline length while maintaining the first baseline position of the first end, the third baseline position and the fourth baseline position of the second weld line and the fifth baseline position and the sixth baseline position of the third weld line;

generating third seam weld fatigue data in the computer system from the third fatigue sensitivity model;

determining a fourth fatigue sensitivity model for the second end by changing the second baseline position for the second end to change the first weld line to a seventh length greater than the first baseline length while maintaining the first baseline position of the first end, the third baseline position and the fourth baseline position of the second weld line and the fifth baseline position and the sixth baseline position of the third weld line;

generating fourth seam weld fatigue data from the fourth fatigue sensitivity model;

determining a fifth fatigue sensitivity model for the third end by changing the third baseline position for the third end to change the second weld line to an eighth length less than the second baseline length while maintaining the first baseline position and the second baseline position of the first weld line, the fourth baseline position of the second weld line and the fifth baseline position and the sixth baseline position of the third weld line;

generating fifth seam weld fatigue data from the fifth fatigue sensitivity model;

determining a sixth fatigue sensitivity model for the third end by changing the third baseline position for the third end to change the second weld line to a ninth length greater than the second baseline length while maintaining the first baseline position and the second baseline position of the first weld line, the fourth baseline position of the second weld line and the fifth baseline position and the sixth baseline position of the third weld line;

generating sixth seam weld fatigue data from the sixth fatigue sensitivity model;

determining a seventh fatigue sensitivity model for the fourth end by changing the fourth baseline position for the fourth end to change the second weld line to a tenth length less than the second baseline length while maintaining the first baseline position and the second baseline position of the first weld line, the third baseline position of the second weld line and the fifth baseline position and the sixth baseline position of the third weld line;

generating seventh seam weld fatigue data from the seventh fatigue sensitivity model;

determining a determining an eighth fatigue sensitivity model for the fourth end by changing the fourth baseline position for the fourth end to change the second weld line to an eleventh length greater than the second baseline length while maintaining the first baseline position and the second baseline position of the first weld line, the third baseline position of the second weld line and the fifth baseline position and the sixth baseline position of the third weld line;

generating eighth seam weld fatigue data from the eighth fatigue sensitivity model;

determining a ninth fatigue sensitivity model for the fifth end by changing the fifth baseline position for the fifth end to change the third weld line to a twelfth length less than the third baseline length while maintaining the first baseline position and the second baseline position of the first weld line, the third baseline position and the fourth baseline position of the second weld line and the sixth baseline position of the third weld line;

generating ninth seam weld fatigue data from the ninth fatigue sensitivity model;

determining a tenth fatigue sensitivity model for the fifth end by changing the fifth baseline position for the fifth end to change the third weld line to a thirteen length greater than the third baseline length while maintaining the first baseline position and the second baseline position of the first weld line, the third baseline position and the fourth baseline position of the second weld line and the sixth baseline position of the third weld line;

generating tenth seam weld fatigue data from the tenth fatigue sensitivity model;

determining an eleventh fatigue sensitivity model for the sixth end by changing the sixth baseline position for the sixth end to change the third weld line to the thirteen length less than the third baseline length while maintaining the first baseline position and the second baseline position of the first weld line, the third baseline position and the fourth baseline position of the second weld line and the fifth baseline position of the third weld line;

generating eleventh seam weld fatigue data from the eleventh fatigue sensitivity model;

determining a twelfth fatigue sensitivity model for the sixth end by changing the sixth baseline position for the sixth end to change the third weld line to a fourteenth length greater than the third baseline length while maintaining the first baseline position and the second baseline position of the first weld line, the third baseline position and the fourth baseline position of the second weld line and the fifth baseline position of the third weld line;

generating twelfth seam weld fatigue data from the twelfth fatigue sensitivity model;

determining six combination models one for each of the plurality of weld ends, each combination model comprising a selected weld length for each of the plurality of weld ends determined by comparing each of the plurality of weld ends to the baseline seam weld fatigue data, the first seam weld fatigue data, the second seam weld fatigue data, the third seam weld fatigue data, the fourth seam weld fatigue data, the fifth seam weld fatigue data, the sixth seam weld fatigue data, the seventh seam weld fatigue data, the eighth seam weld fatigue data, the ninth seam weld fatigue data, the tenth seam weld fatigue data, the eleventh seam weld fatigue data and the twelfth seam weld fatigue data;

determining combination model fatigue data for each of the six combination models, each combination model has a fatigue life for each of the plurality of weld ends;

determining a minimum fatigue life for each of the six combination models; and selecting a weld pattern of the combination model having a highest minimum fatigue life value.

2. The method of claim 1 wherein comparing each of the weld ends to the baseline seam weld fatigue data, the first seam weld fatigue data, the second seam weld fatigue data, the third seam weld fatigue data, the fourth seam weld fatigue data, the fifth seam weld fatigue data, the sixth seam weld fatigue data, the seventh seam weld fatigue data, the eighth seam weld fatigue data, the ninth seam weld fatigue data, the tenth seam weld fatigue data, the eleventh seam weld fatigue data and the twelfth seam weld fatigue data comprises determining a highest fatigue data value from the baseline seam weld fatigue data, the first seam weld fatigue data, the second seam weld fatigue data, the third seam weld fatigue data, the fourth seam weld fatigue data, the fifth seam weld fatigue data, the sixth seam weld fatigue data, the seventh seam weld fatigue data, the eighth seam weld fatigue data, the ninth seam weld fatigue data, the tenth seam weld fatigue data, the eleventh seam weld fatigue data and the twelfth seam weld fatigue data.

3. The method of claim 1 wherein generating six combination models comprises generating a first combination model by determining weld end data using the baseline seam weld fatigue data and the first seam weld fatigue data, determining a second weld end result based on comparing the second seam weld fatigue data and the fourth seam weld fatigue data, and comparing the first seam weld fatigue data, and the second seam weld fatigue data.

* * * * *